United States Patent
Onohara et al.

(10) Patent No.: US 9,590,800 B2
(45) Date of Patent: Mar. 7, 2017

(54) MULTILEVEL MODULATION OPTICAL TRANSCEIVER AND MULTILEVEL MODULATION OPTICAL TRANSMISSION AND RECEPTION METHOD

(71) Applicants: Kiyoshi Onohara, Chiyoda-ku (JP); Tsuyoshi Yoshida, Chiyoda-ku (JP); Takafumi Fujimori, Chiyoda-ku (JP); Yoshiaki Konishi, Chiyoda-ku (JP)

(72) Inventors: Kiyoshi Onohara, Chiyoda-ku (JP); Tsuyoshi Yoshida, Chiyoda-ku (JP); Takafumi Fujimori, Chiyoda-ku (JP); Yoshiaki Konishi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/777,957

(22) PCT Filed: Mar. 26, 2013

(86) PCT No.: PCT/JP2013/058749
§ 371 (c)(1),
(2) Date: Sep. 17, 2015

(87) PCT Pub. No.: WO2014/155515
PCT Pub. Date: Oct. 2, 2014

(65) Prior Publication Data
US 2016/0087786 A1 Mar. 24, 2016

(51) Int. Cl.
*H04B 10/40* (2013.01)
*H04L 27/36* (2006.01)
(Continued)

(52) U.S. Cl.
CPC .......... *H04L 7/0075* (2013.01); *H04J 3/0602* (2013.01); *H04J 3/0691* (2013.01);
(Continued)

(58) Field of Classification Search
USPC ........................................... 398/66
See application file for complete search history.

(56) References Cited

U.S. PATENT DOCUMENTS 9,148,229 B2 * 9/2015 Komaki ............... H04B 10/516
2010/0215060 A1 8/2010 Haas
(Continued)

FOREIGN PATENT DOCUMENTS

EP 2 079 177 A1 7/2009
JP 2011-004207 A 1/2011
(Continued)

OTHER PUBLICATIONS

"Series G: Transmission Systems and Media, Digital Systems and Networks; Series Y: Global Information Infrastructure, Internet Protocol Aspects and Next-Generation Networks" International Telecommunication Union, ITU-T, G.709/Y.1331, Telecommunication Standardization Sector of ITU, Dec. 2009 (Total 218 pages).

(Continued)

*Primary Examiner* — Oommen Jacob
(74) *Attorney, Agent, or Firm* — Oblon, McClelland, Maier & Neustadt, L.L.P.

(57) ABSTRACT

A multilevel modulation optical transceiver for distributing an OTN frame defined by ITU-T to a plurality of lanes for transmission, the multilevel modulation optical transceiver including: an MLD transmission unit; and a data replication unit, further including a data rearrangement unit arranged at a preceding stage of the MLD transmission unit, for performing data rearrangement processing of replicating, in advance, a frame synchronization pattern of an overhead of the OTN frame before being subjected to the lane rotation processing from a first lane that has the overhead to another lane that does not have the overhead, and of saving a payload to be overwritten with the frame synchronization pattern to (Continued)

a reserved area of the overhead to enable the payload to be restored on a reception side.

7 Claims, 8 Drawing Sheets

(51) Int. Cl.
  *H04L 1/00*    (2006.01)
  *H04L 7/00*    (2006.01)
  *H04J 3/16*    (2006.01)
  *H04L 25/14*   (2006.01)
  *H04J 14/08*   (2006.01)
  *H04L 25/49*   (2006.01)
  *H04J 3/04*    (2006.01)
  *H04J 3/06*    (2006.01)

(52) U.S. Cl.
  CPC ............ *H04J 3/1652* (2013.01); *H04J 14/08* (2013.01); *H04L 25/14* (2013.01); *H04L 25/4917* (2013.01); *H04J 3/047* (2013.01); *H04J 3/0688* (2013.01)

(56) References Cited

U.S. PATENT DOCUMENTS

| | | | | |
|---|---|---|---|---|
| 2010/0281343 A1* | 11/2010 | Caggioni | ............... | H03M 13/05 714/776 |
| 2010/0322630 A1 | 12/2010 | Takeuchi et al. | | |
| 2012/0128368 A1* | 5/2012 | Onohara | ............... | H04B 10/40 398/135 |
| 2012/0183303 A1* | 7/2012 | Onohara | ............... | H04B 10/40 398/136 |
| 2012/0219282 A1 | 8/2012 | Koganei et al. | | |
| 2016/0006512 A1* | 1/2016 | Konishi | ............... | H04B 10/25 398/65 |
| 2016/0087786 A1* | 3/2016 | Onohara | ............... | H04J 3/1652 398/66 |

FOREIGN PATENT DOCUMENTS

| | | |
|---|---|---|
| JP | 2011-146906 A | 7/2011 |
| JP | 2011-223454 A | 11/2011 |
| WO | 2011/043398 A1 | 4/2011 |

OTHER PUBLICATIONS

International Search Report issued on May 21, 2013 for PCT/JP2013/058749 filed on Mar. 26, 2013.

European Search Report Application No. 13880575.9 in PCT/JP2013/058749, mailed Sep. 29, 2016 (with English-language Translation) 10 pages.

High Bit-Error Tolerant Frame/Lane Alignment for 100 Gb/s Multi-Lane Transmission; Takyua Ohara, Etsushi Yamazaki, Shigeki Aisawa, and Masahito Tomizawa; NTT Network Innovation Laboratories; 2010; 3 pages.

100-Gb/s Optical Transport Network and Beyond Employing Digital Signal Processing; Etsushi Yamazaki, Masahito Tomizawa, and Yutaka Miyamoto, NTT Corporation, IEEE Communications Magazine, Feb. 2012, 7 pages.

Demonstration of Master-Slave Type Deskew Function for Optical Virtual Concatenation using OTU3 Multiframe Identification; Takashi Ono, Yongmei Sun, and Atsushi Takada, NTT Network Innovation Laboratories, Sep. 21-25, 2008, Brussels, Belgium, 2 pages.

Interfaces for the Optical Transport Network; Series G: Transmission Systems and Media, Digital Systems and Networks; Telecommunication Standardization Sector of ITU; G.709/Y.1331; Feb. 2012; 238 pages.

* cited by examiner

MULTILEVEL MODULATION OPTICAL TRANSCEIVER AND MULTILEVEL MODULATION OPTICAL TRANSMISSION AND RECEPTION METHOD

TECHNICAL FIELD

The present invention relates to a multilevel modulation optical transceiver and a multilevel modulation optical transmission and reception method, which are used for an optical communication system. In particular, the present invention relates to a multilevel modulation optical transceiver and a multilevel modulation optical transmission and reception method, which use, in combination, lane rotation processing defined by an optical transport network-multi-lane distribution (OTN-MLD) and another modulation scheme involving data replication between a plurality of lanes.

BACKGROUND ART

For example, the following schemes are given as related-art optical modulation schemes, which have been used in an optical communication system.
On-off keying (OOK)
Binary phase-shift keying (BPSK)

In recent years, in order to deal with an increasing amount of traffic flowing through the Internet, there has been studied a scheme, which utilizes a multilevel phase modulation signal using a digital signal processing technology, and is capable of achieving a large-capacity communication system. For example, the following methods are given as such a multilevel modulation optical transmission and reception method, which utilizes a multilevel phase modulation signal.
Quadrature phase-shift keying: (QPSK)
Differential QPSK (DQPSK)
Eight quadrature amplitude modulation (8QAM)

As compared with the related-art scheme, which allocates the intensity of an optical signal to a binary signal to directly perform detection, in a digital coherent reception scheme, the intensity of an optical signal and phase information are subjected to analog/digital (A/D) conversion, and the resultant is demodulated by a digital signal processing unit.

In the above-mentioned digital coherent reception scheme, there is an advantage in that a mechanism for synchronizing frequencies and phases of a transmission light source and a local oscillator light source with reception light can be implemented as digital signal processing. With this, without the need to use an optical phase-locked loop (PLL), which is difficult to be implemented, it is possible to synchronize the frequencies and phases of the transmission light source and the local transmission light source with the reception light.

On the other hand, as a representative framing scheme to be used for transmission of a client signal through an optical communication channel, there can be given a scheme, which uses an optical transport network (OTN) frame defined by the Internal Telecommunication Union Telecommunication Standardization Sector (ITU-T) (see, for example, Non Patent Literature 1).

With the scheme using the OTN frame, along with the progress in a wavelength multiplexing technology, it is possible to perform long-haul and large-capacity transmission with high reliability. Further, the scheme has such a function as centralization of monitoring and control, and hence the scheme is widely used mainly in a metropolitan network connecting metropolitan areas to each other and a core network connecting bases of Internet service providers or telecommunications carriers to each other.

Note that, in a multilevel modulation optical transceiver for transmitting the OTN frame by distributing the OTN frame to a plurality of lanes with the use of the flexibility in polarization/phase/wavelength of an optical signal, due to an influence of dispersion caused by the difference in polarization/phase/wavelength of the optical signal, skew between the respective lanes on the reception side becomes a problem in some cases.

The optical transport network-multi-lane distribution (OTN-MLD) is defined as a method for solving this problem. With the OTN-MLD, it is possible to correct the skew between the respective lanes by detecting a shift in a relative position of a frame synchronization pattern with the use of overhead information of the OTN frame.

CITATION LIST

Non Patent Literature

[NPL 1] ITU-T Recommendation G.709

SUMMARY OF INVENTION

Technical Problem

However, the related art has the following problems.

In the related-art multilevel modulation optical transceiver, lane rotation processing (barrel shift) defined by the OTN-MLD is performed on the OTN frame defined by the ITU-T, to thereby enable the skew to be corrected on the reception side.

However, when the lane rotation processing defined by the OTN-MLD and another modulation scheme involving data replication between a plurality of lanes are used in combination, a frame alignment signal (FAS) and a multi-frame alignment signal (MFAS), which are included in a frame synchronization pattern of an overhead, are overwritten at the time of data replication, and the FAS and the MFAS are consequently lost. Thus, the skew cannot be corrected accurately on the reception side. This has been a problem of the related art.

Further, if this problem is intended to be solved by changing a processing procedure of the modulation scheme involving the data replication processing, a circuit for the related-art modulation scheme involving the data replication processing cannot be used as it is, and hence the type of modulation schemes that can be supported is limited. This has been another problem of the related art. Further, a circuit change is complicated, and hence a power consumption is large. This has been still another problem of the related art.

The present invention has been made in order to solve the problems described above, and has an object to provide a multilevel modulation optical transceiver and a multilevel modulation optical transmission and reception method, which are capable of, even when lane rotation processing defined by OTN-MLD and another modulation scheme involving data replication between a plurality of lanes are used in combination, correcting skew accurately on a reception side without a frame synchronization pattern being lost, and supporting various types of modulation schemes with a simple configuration and a low power consumption.

Solution to Problem

According to one embodiment of the present invention, there is provided a multilevel modulation optical transceiver for distributing an OTN frame defined by ITU-T to a plurality of lanes for transmission, the multilevel modulation optical transceiver including: an MLD transmission unit for performing lane rotation processing defined by OTN-MLD on the OTN frame; a data replication unit for performing data replication processing involving data replication between the plurality of lanes on the OTN frame after being subjected to the lane rotation processing; and a data rearrangement unit arranged at a preceding stage of the MLD transmission unit, for performing data rearrangement processing of replicating, in advance, a frame synchronization pattern of an overhead of the OTN frame before being subjected to the lane rotation processing from a first lane that has the overhead to another lane that does not have the overhead, and of saving a payload to be overwritten with the frame synchronization pattern to a reserved area of the overhead so as to enable the payload to be restored on a reception side, in which the MLD transmission unit performs the lane rotation processing on the OTN frame after being subjected to the data rearrangement processing by the data rearrangement unit.

According to one embodiment of the present invention, there is provided a multilevel modulation optical transmission and reception method for distributing an OTN frame defined by ITU-T to a plurality of lanes for transmission, the multilevel modulation optical transmission and reception method including: a lane rotation processing step of performing lane rotation processing defined by OTN-MLD on the OTN frame; a data replication step of performing data replication processing involving data replication between the plurality of lanes on the OTN frame after being subjected to the lane rotation processing; and a data rearrangement step of performing data rearrangement processing of replicating, in advance, a frame synchronization pattern of an overhead of the OTN frame before being subjected to the lane rotation processing in the lane rotation processing step from a first lane that has the overhead to another lane that does not have the overhead, and of saving a payload to be overwritten with the frame synchronization pattern to a reserved area of the overhead so as to enable the payload to be restored on a reception side, in which the lane rotation processing step includes performing the lane rotation processing on the OTN frame after being subjected to the data rearrangement processing in the data rearrangement step.

Advantageous Effects of Invention

According to the one embodiment of the present invention, the frame synchronization pattern of the overhead of the OTN frame is replicated in advance from the lane that has the overhead to another lane that does not have the overhead, and further, the payload to be overwritten with the frame synchronization pattern is saved to the reserved area of the overhead so as to enable the payload to be restored on the reception side. In this manner, it is possible to provide the multilevel modulation optical transceiver and the multilevel modulation optical transmission and reception method, which are capable of, even when the lane rotation processing defined by the OTN-MLD and another modulation scheme involving the data replication between the plurality of lanes are used in combination, correcting the skew accurately on the reception side without the frame synchronization pattern being lost, and supporting various types of modulation schemes with a simple configuration and a low power consumption.

DESCRIPTION OF EMBODIMENTS

A description is now given of a multilevel modulation optical transceiver and a multilevel modulation optical transmission and reception method according to preferred embodiments of the present invention referring to the drawings. Note that, throughout the drawings, the same or corresponding components are denoted by the same reference numerals to describe those components.

First Embodiment

Figure 1:
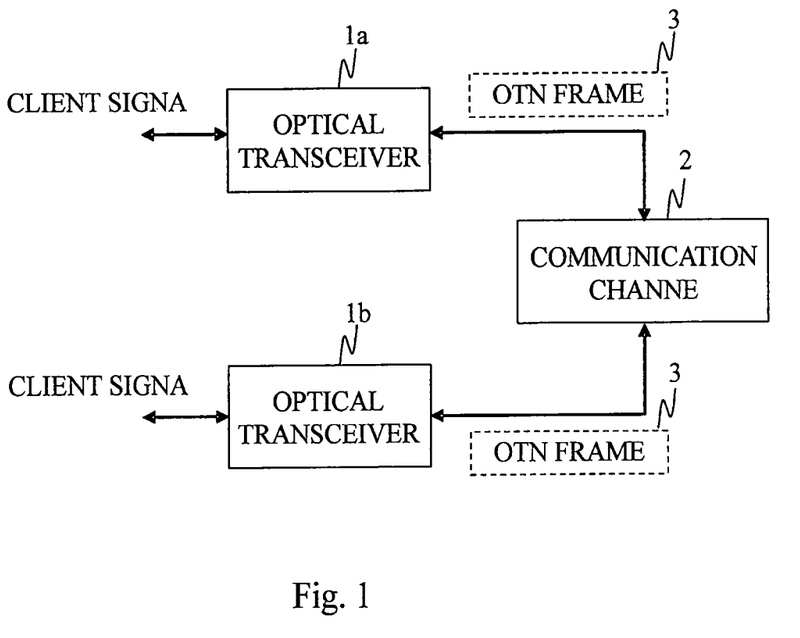
FIG. 1 is a schematic diagram of an optical communication system according to a first embodiment of the present invention.

FIG. 1 is a schematic diagram of an optical communication system according to a first embodiment of the present invention. The optical communication system illustrated in FIG. 1 includes optical transceivers 1a and 1b and an optical communication channel 2.

Each of the optical transceivers 1a and 1b illustrated in FIG. 1 has both a function of transmitting an OTN frame 3 and a function of receiving the OTN frame 3, and can bi-directionally exchange the OTN frame 3 therebetween via the optical communication channel 2.

Figure 2:
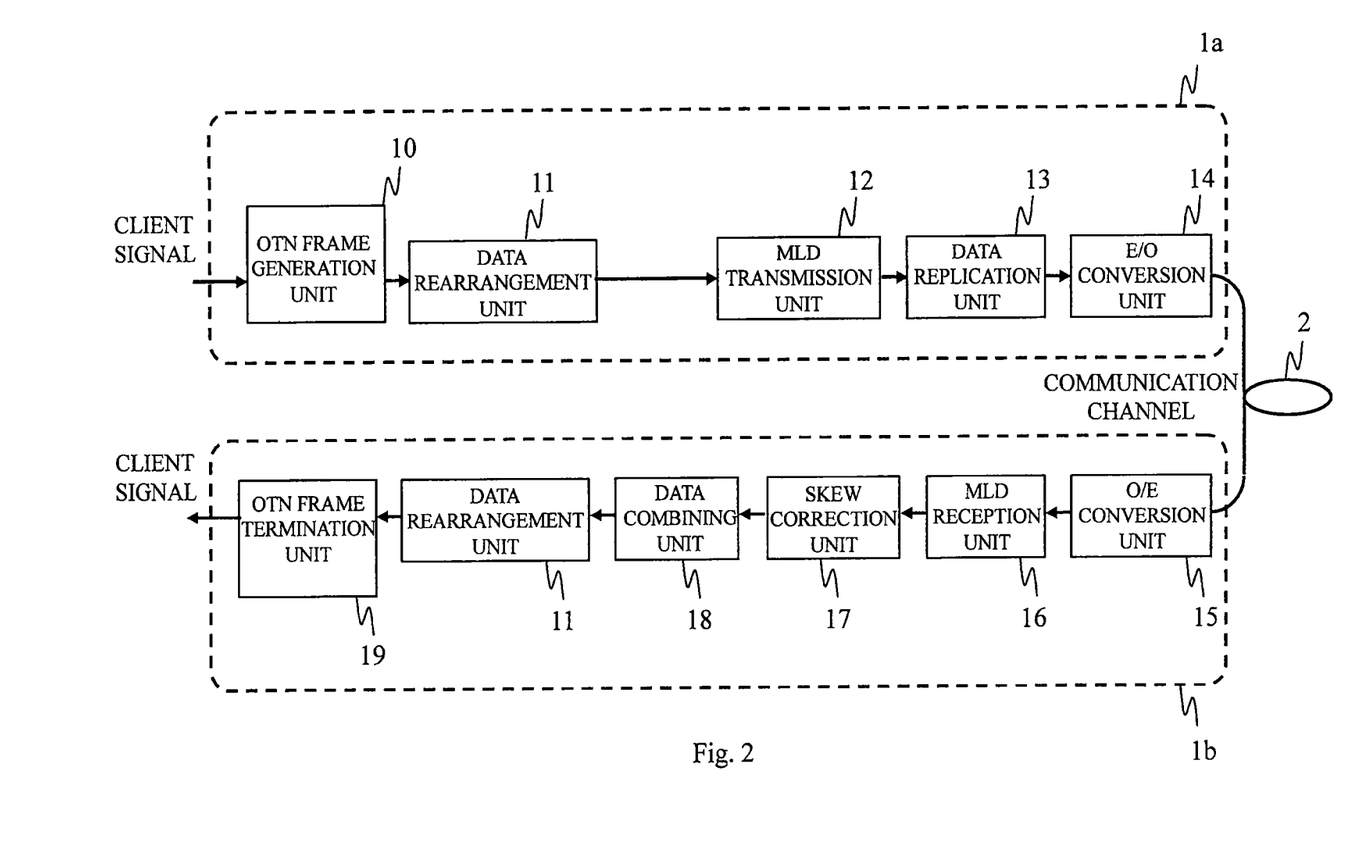
FIG. 2 is a diagram for illustrating an example of internal configurations of optical transceivers according to the first embodiment of the present invention.

FIG. 2 is a diagram for illustrating an example of internal configurations of the optical transceivers 1a and 1b according to the first embodiment of the present invention. FIG. 2 is an illustration of a case where the optical transceiver 1a is a transmission side and the optical transceiver 1b is a reception side. Transmission circuits of the optical transceiver 1a include an OTN frame generation unit 10, a data rearrangement unit 11, an MLD transmission unit 12, a data replication unit 13, and an E/O conversion unit 14.

Further, reception circuits of the optical transceiver 1b include an O/E conversion unit 15, an MLD reception unit 16, a skew correction unit 17, a data combining unit 18, a data rearrangement unit 11, and an OTN frame termination unit 19.

In the following, a description is given of respective functions of the components of the multilevel modulation optical transceiver according to the first embodiment and a flow of the OTN frame 3. It should be noted that the description is given on the assumption that, for the sake of simplicity, as illustrated in FIG. 2, the optical transceiver 1a only transmits the OTN frame 3 and the optical transceiver 1b only receives the OTN frame 3 (in actuality, as described above, each of the optical transceivers 1a and 1b has both the function of transmitting the OTN frame 3 and the function of receiving the OTN frame 3, and includes all of the components of the optical transceivers 1a and 1b illustrated in FIG. 2).

First, a description is given of the respective functions of the components of the optical transceiver 1a on the transmission side and a flow of transmission data.

Figure 3A:
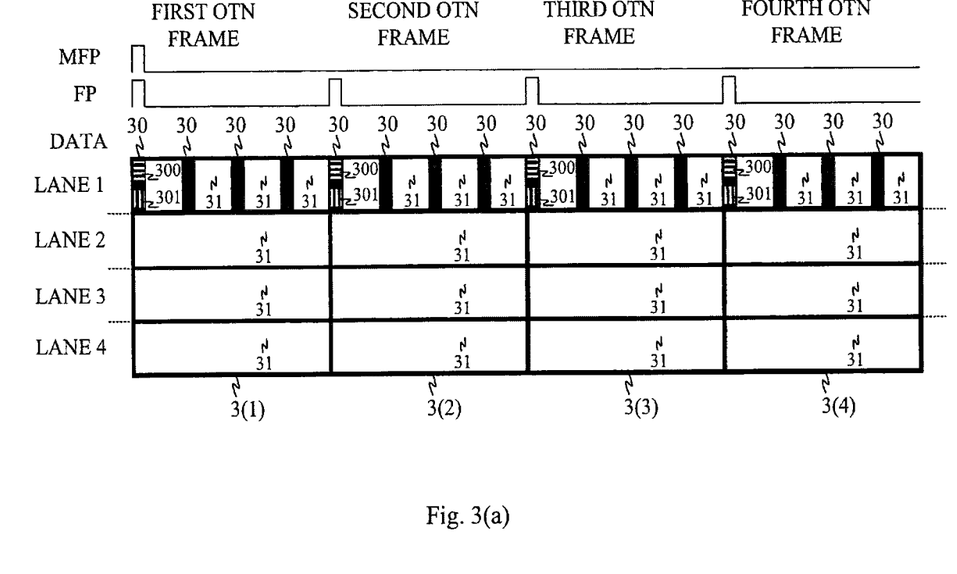
FIGS. 3(a), 3(b) are diagrams for illustrating an example of processing of generating an OTN frame by an OTN frame generation unit according to the first embodiment of the present invention.
Figure 3B:
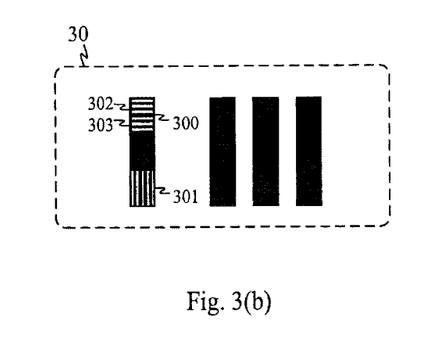

FIGS. 3(a), 3(b) are diagrams for illustrating an example of processing of generating the OTN frame 3 by the OTN frame generation unit 10 according to the first embodiment of the present invention.

Each of OTN frames 3(1) to 3(4) illustrated in FIG. 3(a) includes overheads 30 and payloads 31. Further, each of the overheads 30 includes a frame synchronization pattern 300 and a reserved area 301. Further, as illustrated in FIG. 3(b), the frame synchronization pattern 300 includes a FAS 302 and an MFAS 303.

The OTN frame generation unit 10 generates from a client signal the OTN frame 3 defined by the ITU-T (see Non Patent Literature 1).

Specifically, the OTN frame generation unit 10 first accommodates the client signal such as an Ethernet (trademark) signal in the payload 31. Then, the OTN frame generation unit 10 adds OPU, ODU, and OTU overheads, which are pieces of header information necessary for maintenance and control, to the payload 31, to thereby generate an optical channel transport unit-k (OTUk, where k=0, 1, 2, 3, 4 . . . ) frame.

Further, the OTN frame generation unit 10 adds the frame synchronization pattern 300 including the FAS 302 and the MFAS 303, which are pieces of header information necessary for frame synchronization, to the OTUk frame in synchronization with a frame pulse (FP) on the circuits of the optical transceiver 1a, to thereby generate the OTN frame 3 to be used to transmit the client signal to the optical communication channel 2.

Further, the OTN frame generation unit 10 generates a multi-frame including a plurality of (=m) OTN frames 3 in synchronization with a multi-frame pulse (MFP) on the circuits of the optical transceiver 1a. Note that, although a case where m=4 is illustrated in FIGS. 3(a), 3(b), m of the present invention is not limited to 4. It is only necessary that m be a natural number.

Further, the OTN frame 3 is transmitted after being distributed to a plurality of (=n) lanes with the use of the flexibility in polarization/phase/wavelength of an optical signal. Although a case where n=4 is illustrated in FIGS. 3(a), 3(b), n of the present invention is not limited to 4. It is only necessary that n be a natural number.

In this manner, by transmitting the OTN frame 3 by distributing the OTN frame 3 to the plurality of lanes with the use of the flexibility in polarization/phase/wavelength of the optical signal, it is possible to achieve a large-capacity optical communication system.

Note that, in this case, as illustrated in FIGS. 3(a), 3(b), the OTN frames 3(1) to 3(4) generated by the OTN frame generation unit 10 are distributed in accordance with the definition of the ITU-T so that the overhead 30 exists only in a lane 1.

Figure 4:
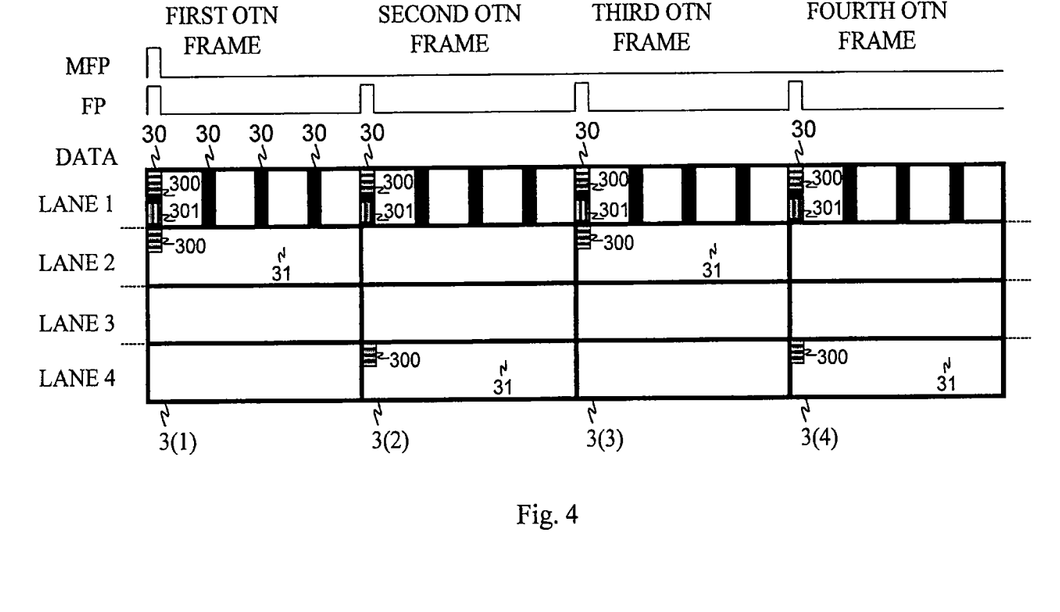
FIG. 4 is a diagram for illustrating an example of data rearrangement processing for the OTN frame by a data rearrangement unit according to the first embodiment of the present invention.

Next, FIG. 4 is a diagram for illustrating an example of data rearrangement processing for the OTN frame 3 by the data rearrangement unit 11 according to the first embodiment of the present invention.

As described above in the "Technical Problem" section, in the multilevel modulation optical transceiver for distributing the OTN frame 3 to the plurality of lanes for transmission, there has been a problem in that when the MLD transmission unit 12 described later and the data replication unit 13 also described later are used in combination, the frame synchronization pattern 300 of the overhead 30 is lost, and hence the skew cannot be corrected accurately on the reception side. A process in which the frame synchronization pattern 300 is lost is described in detail later with reference to FIGS. 6(a), 6(b).

In view of this, the data rearrangement unit 11 replicates, in advance, the frame synchronization pattern 300 of the overhead 30 of the OTN frame 3 from the lane 1 that has the overhead 30 to another lane that does not have the overhead 30, and saves the payload 31 to be overwritten with the frame synchronization pattern 300 to the reserved area 301 of the overhead 30 so as to enable the payload 31 to be restored on the reception side.

Specifically, as illustrated in FIG. 4, in each of the first OTN frame 3(1) and the third OTN frame 3(3), the data rearrangement unit 11 replicates the frame synchronization pattern 300 from the lane 1 to a lane 2. Further, in each of the second OTN frame 3(2) and the fourth OTN frame 3(4), the data rearrangement unit 11 replicates the frame synchronization pattern 300 from the lane 1 to a lane 4.

Further, at this time, in each of the OTN frames 3(1) to 3(4), the data rearrangement unit 11 saves the payload 31 to be overwritten with the frame synchronization pattern 300 to the reserved area 301 of the overhead 30 of the lane 1. Note that, the payload 31 saved at this time is restored by the data rearrangement unit 11 on the reception side at the time of processing of receiving the OTN frame 3, from the reserved area 301 of the overhead 30 to the area of the payload 31.

In this manner, through the data rearrangement processing performed in advance by the data rearrangement unit 11, even when the MLD transmission unit 12 and the data replication unit 13 are used in combination, the frame synchronization pattern 300 is not lost, and hence the skew can be corrected accurately on the reception side. This effect is also described in detail later with reference to FIGS. 6(a), 6(b).

Figure 5:
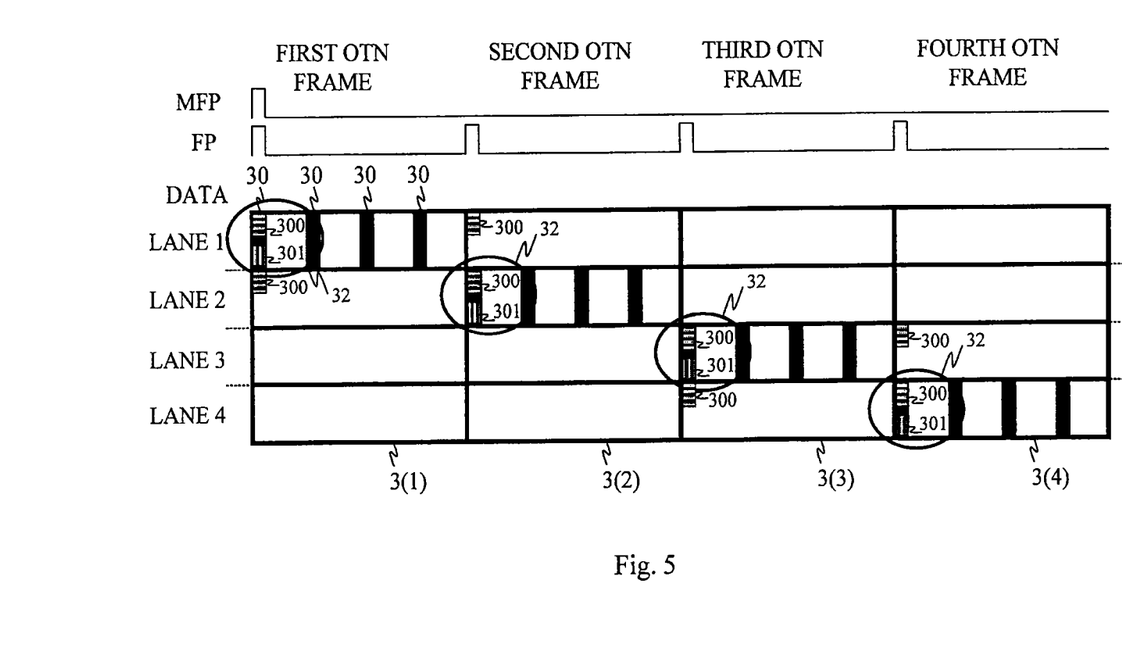
FIG. 5 is a diagram for illustrating an example of lane rotation processing for the OTN frame by an MLD transmission unit according to the first embodiment of the present invention.

Next, FIG. 5 is a diagram for illustrating an example of lane rotation processing for the OTN frame 3 by the MLD transmission unit 12 according to the first embodiment of the present invention.

As described above in the description of the OTN frame generation unit 10, as illustrated in FIGS. 3(a), 3(b), the OTN frame generation unit 10 distributes the OTN frames 3(1) to 3(4) in accordance with the definition of the ITU-T so that the overhead 30 exists only in the lane 1.

However, in the multilevel modulation optical transceiver for distributing the OTN frame 3 to the plurality of lanes for transmission, in order that the skew is corrected accurately on the reception side, it is necessary for the frame synchronization pattern 300 of the overhead 30 of the OTN frame 3 to exist in every lane.

In view of this, the MLD transmission unit 12 performs lane rotation processing (barrel shift) defined by the OTN-MLD on the OTN frames 3(1) to 3(4) generated by the OTN frame generation unit 10.

Specifically, as illustrated in FIG. 5, the MLD transmission unit 12 leaves the first OTN frame 3(1) as it is, and for the second OTN frame 3(2), shifts the lane 1 to the lane 2, the lane 2 to a lane 3, and the lane 3 to the lane 4.

Further, for the third OTN frame 3(3), the MLD transmission unit 12 shifts the lane 1 to the lane 3, the lane 2 to the lane 4, the lane 3 to the lane 1, and the lane 4 to the lane 2. Further, for the fourth OTN frame 3(4), the MLD transmission unit 12 shifts the lane 1 to the lane 4, the lane 2 to the lane 1, the lane 3 to the lane 2, and the lane 4 to the lane 3.

As a result of this processing, in all of the lanes, the frame synchronization pattern 300 exists at a synchronization pattern detection portion 32 indicated by the circle in FIG. 5, and hence the skew can be corrected accurately on the reception side.

Figure 6A:
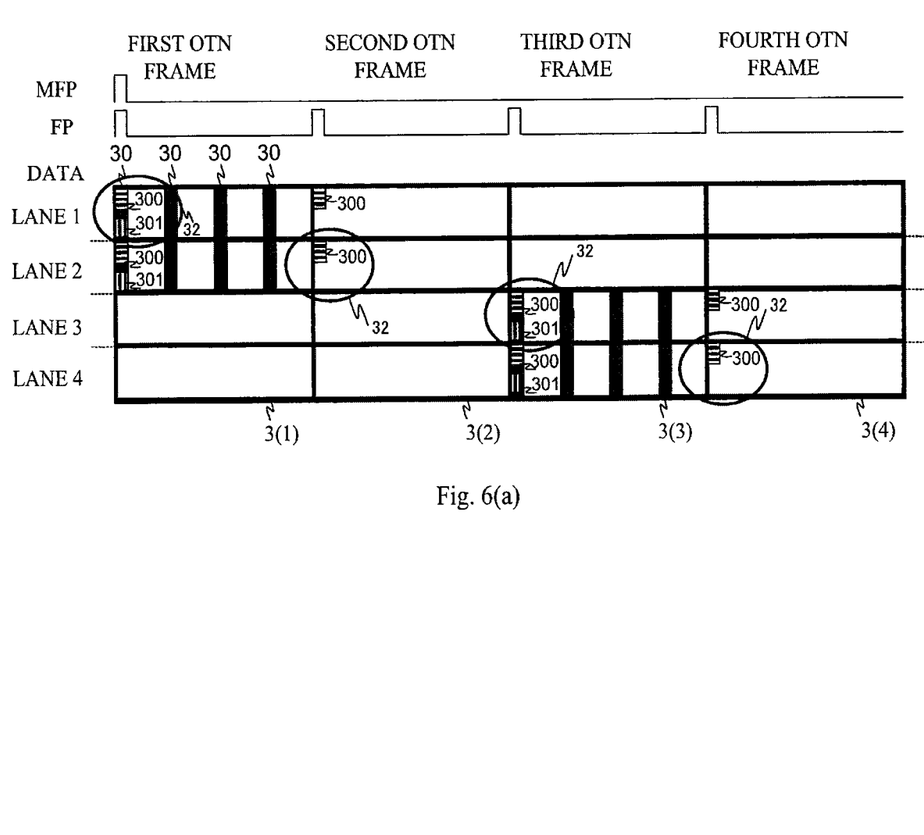
FIGS. 6(a), 6(b) are diagrams for illustrating an example of data replication processing for the OTN frame by a data replication unit according to the first embodiment of the present invention.
Figure 6B:
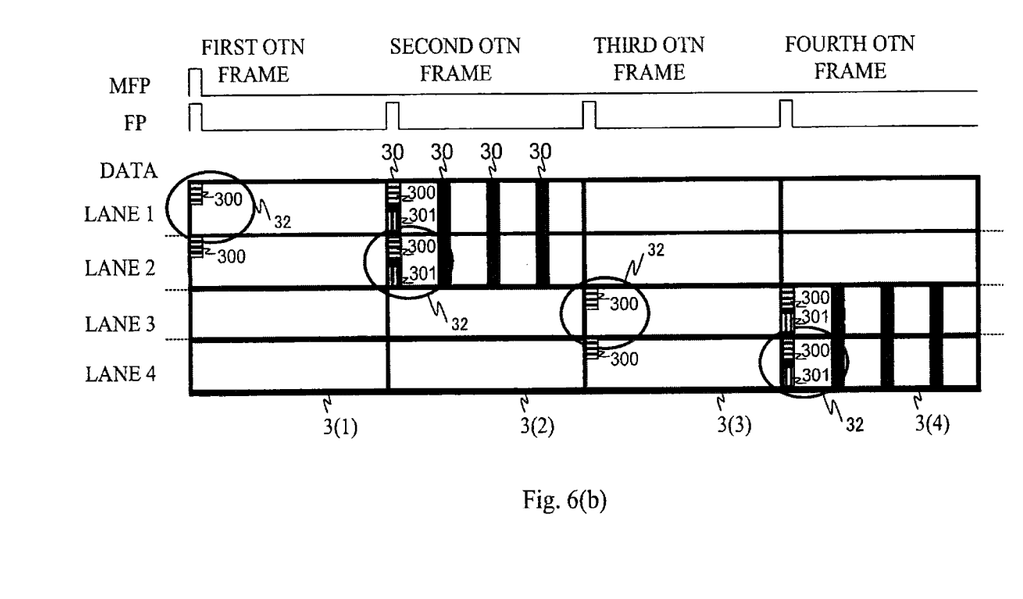

Next, FIGS. 6(a), 6(b) are diagrams for illustrating an example of data replication processing for the OTN frame 3 by the data replication unit 13 according to the first embodiment of the present invention.

As described above in the "Background Art" section, in the multilevel modulation optical transceiver for transmitting the OTN frame 3 by distributing the OTN frame 3 to the plurality of lanes with the use of the flexibility in polarization/phase/wavelength of the optical signal, due to an influence of dispersion caused by the difference in polarization/phase/wavelength of the optical signal, the skew between the respective lanes on the reception side becomes a problem. In particular, this skew becomes conspicuous when the OTN frame 3 is transmitted for a long distance.

In view of this, in order to solve the problem of the skew between the respective lanes on the reception side, for example, the data replication unit 13 performs data replication processing so that the OTN frame 3 is transmitted alternately between the odd-numbered lane and the even-numbered lane.

Specifically, as illustrated in FIGS. 6(a), 6(b), the data replication unit 13 first replicates the multi-frame to generate two identical multi-frames. Next, as illustrated in FIG. 6(a), for one of the multi-frames, the data replication unit 13 replicates the lane 1 to the lane 2 and replicates the lane 3 to the lane 4. Further, as illustrated in FIG. 6(b), for the other of multi-frames, the data replication unit 13 replicates the lane 2 to the lane 1 and replicates the lane 4 to the lane 3. The optical transceiver 1a then transmits those two multi-frames to the optical communication channel 2 in order.

Further, on the reception side, the odd-numbered lane is received for the first OTN frame 3(1) and the third OTN frame 3(3), and the even-numbered lane is received for the second OTN frame 3(2) and the fourth OTN frame 3(4).

As a result of this processing, the number of lanes that are simultaneously processed on the reception side is reduced to a half, and hence tolerance to noise that is added during the transmission is enhanced.

Further, the data rearrangement unit 11 arranged at the preceding stage performs the data rearrangement processing for the OTN frame 3 in advance. Accordingly, the frame synchronization pattern 300 is not lost at the time of the data replication between the lanes by the data replication unit 13, and as illustrated in FIGS. 6(a), 6(b), in all of the lanes, the frame synchronization pattern 300 exists at the synchronization pattern detection portion 32 indicated by the circle.

Note that, the processing procedure of the data rearrangement processing illustrated as an example in FIG. 4 is determined based on the processing procedure of the data replication processing.

Further, such data rearrangement processing that "the frame synchronization pattern 300 is replicated from the lane 1 to the lane 2 or the lane 4" illustrated as an example in FIG. 4 can be used only in the case where such data replication processing that "the data is replicated between the lane 1 and the lane 2, and between the lane 3 and the lane 4" illustrated as an example in FIGS. 6(a), 6(b) is performed.

In other words, when another piece of data replication processing is performed by the data replication unit 13, the data rearrangement unit 11 also needs to perform another type of data rearrangement processing corresponding to the other piece of data replication processing. It is possible to generalize a method of determining a specific processing procedure for such data rearrangement processing corresponding to the data replication processing.

Specifically, in the data replication processing, in the case where the data is replicated between a lane i and a lane j (where i and j are each an integer of 1 or more and n corresponding to the number of lanes or less, and are different from each other), it is only necessary that the data rearrangement processing be performed in advance so that under a state immediately after the lane rotation processing illustrated in FIG. 5, the frame synchronization patterns 300 exist in a j-th OTN frame 3(j) of the lane i and an i-th OTN frame 3(i) of the lane j.

For example, in the data replication processing, in the case where the data is replicated between the lane 1 and the lane 4, and between the lane 2 and the lane 3, it is only necessary that under the state immediately after the lane rotation processing, the frame synchronization patterns 300 exist in the fourth OTN frame 3(4) of the lane 1 and the first OTN frame 3(1) of the lane 4, and the frame synchronization patterns 300 exist in the third OTN frame 3(3) of the lane 2 and the second OTN frame 3(2) of the lane 3.

Accordingly, in order to achieve this, it is only necessary that in the data rearrangement processing, in the first OTN frame 3(1) and the third OTN frame 3(3), the frame synchronization patterns 300 be replicated in advance from the lane 1 to the lane 4, and in the second OTN frame 3(2) and the fourth OTN frame 3(4), the frame synchronization patterns 300 be replicated in advance from the lane 1 to the lane 2.

Further, although the exemplary case where the number of lanes that are simultaneously processed on the reception side is reduced to a half is illustrated in FIGS. 6(a), 6(b), based on a similar consideration, it is also possible to generalize a procedure in a case where the number of lanes that are simultaneously processed is reduced to 1/L, where L is a natural number.

For example, it is only necessary that the following procedure be performed in a case where L=4. First, in the data rearrangement processing, the frame synchronization pattern 300 of the lane 1 is replicated to all of the other lanes. Next, the lane rotation processing is performed. Subsequently, in the data replication processing, the multi-frame is replicated to generate four multi-frames. Then, in a first multi-frame, the lane 1 is replicated to all of the other lanes. Similarly, in each of other i-th (i=2 to 4) multi-frames, the lane i is replicated to all of the other lanes. Finally, the four multi-frames are transmitted to the optical communication channel 2 in order.

The E/O conversion unit 14 performs electrical/optical (E/O) conversion on an input from the data replication unit 13, and transmits the resultant signal to the optical communication channel 2.

Next, a description is given of the respective functions of the components of the optical transceivers 1b on the reception side and a flow of reception data.

The O/E conversion unit 15 performs optical/electrical (O/E) conversion on the signal transmitted from the optical communication channel 2, and outputs the resultant signal to the MLD reception unit 16.

The MLD reception unit 16 analyzes, for each of the lanes, the frame synchronization pattern 300 existing at the synchronization pattern detection portion 32 indicated by the circle in FIGS. 6(a), 6(b), to thereby detect a shift in the relative position of the OTN frame 3. Further, the MLD reception unit 16 corrects the lane whose place is switched in the O/E conversion unit 15.

However, in this case, the frame synchronization pattern 300 existing at a location other than the synchronization pattern detection portion 32, which is illustrated in FIGS. 6(a), 6(b), may cause erroneous synchronization on the reception side.

In particular, the FAS 302 of the frame synchronization pattern 300 has a synchronization pattern "F6F6F6282828" defined by the ITU-T, and on the reception side, this synchronization pattern is used as a mark to detect the head of the frame, and hence the FAS 302 is liable to cause the erroneous synchronization. On the other hand, the MFAS 303 of the frame synchronization pattern 300 only has information indicating an order of the frame and does not have such a synchronization pattern as in the FAS 302, and hence the MFAS 303 does not cause the erroneous synchronization.

In view of this, to detect the frame synchronization pattern 300, instead of the FAS 302, the MLD reception unit 16 uses the MFAS 303 of the frame synchronization pattern 300.

In order to achieve this, the data rearrangement unit 11 rewrites, in advance, the value of every FAS 302 to a value other than "F6F6F6282828" defined by the ITU-T so that the rewritten value is not detected on the reception side.

As a result of this processing, while the erroneous synchronization caused by the FAS 302 is prevented, the frame synchronization pattern 300 can be detected on the reception side with the use of the MFAS 303 instead of the FAS 302. On this occasion, the information indicating the order of the frame that the MFAS 303 has differs for each frame, and hence the MFAS 303 does not cause an erroneous operation.

Note that, the value set as the FAS 302 in order to disable the FAS 302 may be any value that is different from the value "F6F6F6282828", which is defined by the OTN of the ITU-T. The value can be set to, for example, "FFFFFF000000".

Further, instead of setting the same value as the set value, a value that is different for each lane/frame may be set as the set value. For example, by setting a lane number/frame number as the FAS 302 and using this information effectively on the reception side, it is possible to enhance skew correction accuracy on the reception side.

The skew correction unit 17 performs lane switching processing and skew correction processing based on a result of the detection of the frame synchronization pattern 300 by the MLD reception unit 16.

The data combining unit 18 performs processing reverse to the data replication processing performed by the data replication unit 13 on the transmission side. Specifically, the data combining unit 18 selects a necessary lane from among the plurality of replicated lanes.

The data rearrangement unit 11 performs processing reverse to the data rearrangement processing performed by the data rearrangement unit 11 on the transmission side. Specifically, the data rearrangement unit 11 restores the payload 31 that has been saved to the reserved area 301 of the overhead 30.

The OTN frame termination unit 19 performs processing reverse to the processing of generating the OTN frame 3, which is performed by the OTN frame generation unit 10 on the transmission side. Specifically, the OTN frame termination unit 19 deletes the overhead 30 to terminate the OTN frame 3.

As described above, the optical transceiver according to the first embodiment includes the data rearrangement unit for replicating, in advance, the frame synchronization pattern of the overhead of the OTN frame from the lane 1 that has the overhead to another lane that does not have the overhead, and saving the payload to be overwritten with the frame synchronization pattern to the reserved area of the overhead so as to enable the payload to be restored on the reception side.

As a result of this configuration, even when the lane rotation processing defined by the OTN-MLD and another modulation scheme involving the data replication between the plurality of lanes are used in combination, it is possible to correct the skew accurately on the reception side without the frame synchronization pattern being lost.

Further, the data rearrangement processing does not affect another modulation scheme such as the MLD transmission unit for performing the lane rotation processing or the data replication unit for performing the data replication processing, and hence it is possible to use another modulation scheme that has hitherto been used as it is without a circuit change. As a result of this configuration, it is possible to provide the multilevel modulation optical transceiver and the multilevel modulation optical transmission and reception method, which are capable of supporting various types of modulation schemes with a simple configuration and a low power consumption.

The invention claimed is:

1. A multilevel modulation optical transceiver for distributing an OTN frame defined by ITU-T to a plurality of lanes for transmission, the multilevel modulation optical transceiver comprising:
    an MLD transmission processing circuitry for performing lane rotation processing defined by OTN-MLD on the OTN frame; and
    a data replication processing circuitry for performing data replication processing involving data replication between the plurality of lanes on the OTN frame after being subjected to the lane rotation processing,
    the multilevel modulation optical transceiver further comprising a data rearrangement processing circuitry arranged at a preceding stage of the MLD transmission processing circuitry, for performing data rearrangement processing of replicating, in advance, a frame synchronization pattern of an overhead of the OTN frame before being subjected to the lane rotation processing from a first lane that has the overhead to another lane that does not have the overhead, and of saving a payload to be overwritten with the frame synchronization pattern to a reserved area of the overhead so as to enable the payload to be restored on a reception side,
    wherein the MLD transmission processing circuitry performs the lane rotation processing on the OTN frame after being subjected to the data rearrangement processing by the data rearrangement processing circuitry.

2. A multilevel modulation optical transceiver according to claim 1, wherein when a number of the plurality of lanes is represented by n, in a case where data replication is performed between a lane i, where i is an integer of 1 or more and n or less, and a lane j, where j is an integer of 1 or more and n or less and is different from i, in the data replication processing by the data replication processing circuitry, the data rearrangement processing circuitry performs the data rearrangement processing in advance so that under a state after the lane rotation processing is performed by the MLD transmission processing circuitry, the frame synchronization patterns exist in a j-th OTN frame of the lane i and an i-th OTN frame of the lane j.

3. A multilevel modulation optical transceiver according to claim 1, wherein the data rearrangement processing circuitry rewrites a frame alignment signal (FAS) of the overhead of the OTN frame before being subjected to the lane rotation processing by the MLD transmission processing circuitry to a value other than a value defined by the ITU-T so as to prevent the FAS from being detected on the reception side, to thereby cause the frame synchronization pattern of the OTN frame to be detected on the reception side of the multilevel modulation optical transceiver with use of, instead of the FAS, a multi-frame alignment signal (MFAS) of the overhead.

4. A multilevel modulation optical transceiver according to claim 3, wherein the data rearrangement processing circuitry rewrites the FAS of the overhead to a value that is different for each of the plurality of lanes, to thereby cause information on the FAS to be used on the reception side of the multilevel modulation optical transceiver in order to enhance skew correction accuracy.

5. A multilevel modulation optical transmission and reception method for distributing an OTN frame defined by ITU-T to a plurality of lanes for transmission, the multilevel modulation optical transmission and reception method comprising:
 a lane rotation processing step of performing lane rotation processing defined by OTN-MLD on the OTN frame; and
 a data replication step of performing data replication processing involving data replication between the plurality of lanes on the OTN frame after being subjected to the lane rotation processing,
 the multilevel modulation optical transmission and reception method further comprising a data rearrangement step of performing data rearrangement processing of replicating, in advance, a frame synchronization pattern of an overhead of the OTN frame before being subjected to the lane rotation processing in the lane rotation processing step from a first lane that has the overhead to another lane that does not have the overhead, and of saving a payload to be overwritten with the frame synchronization pattern to a reserved area of the overhead so as to enable the payload to be restored on a reception side,
 wherein the lane rotation processing step comprises performing the lane rotation processing on the OTN frame after being subjected to the data rearrangement processing in the data rearrangement step.

6. A multilevel modulation optical transceiver according to claim 2, wherein the data rearrangement processing circuitry rewrites a frame alignment signal (FAS) of the overhead of the OTN frame before being subjected to the lane rotation processing by the MLD transmission processing circuitry to a value other than a value defined by the ITU-T so as to prevent the FAS from being detected on the reception side, to thereby cause the frame synchronization pattern of the OTN frame to be detected on the reception side of the multilevel modulation optical transceiver with use of, instead of the FAS, a multi-frame alignment signal (MFAS) of the overhead.

7. A multilevel modulation optical transceiver according to claim 6, wherein the data rearrangement processing circuitry rewrites the FAS of the overhead to a value that is different for each of the plurality of lanes, to thereby cause information on the FAS to be used on the reception side of the multilevel modulation optical transceiver in order to enhance skew correction accuracy.

* * * * *